Aug. 31, 1943.   W. A. CRAIG   2,328,059
MANUFACTURE OF ETHER
Filed Sept. 18, 1940
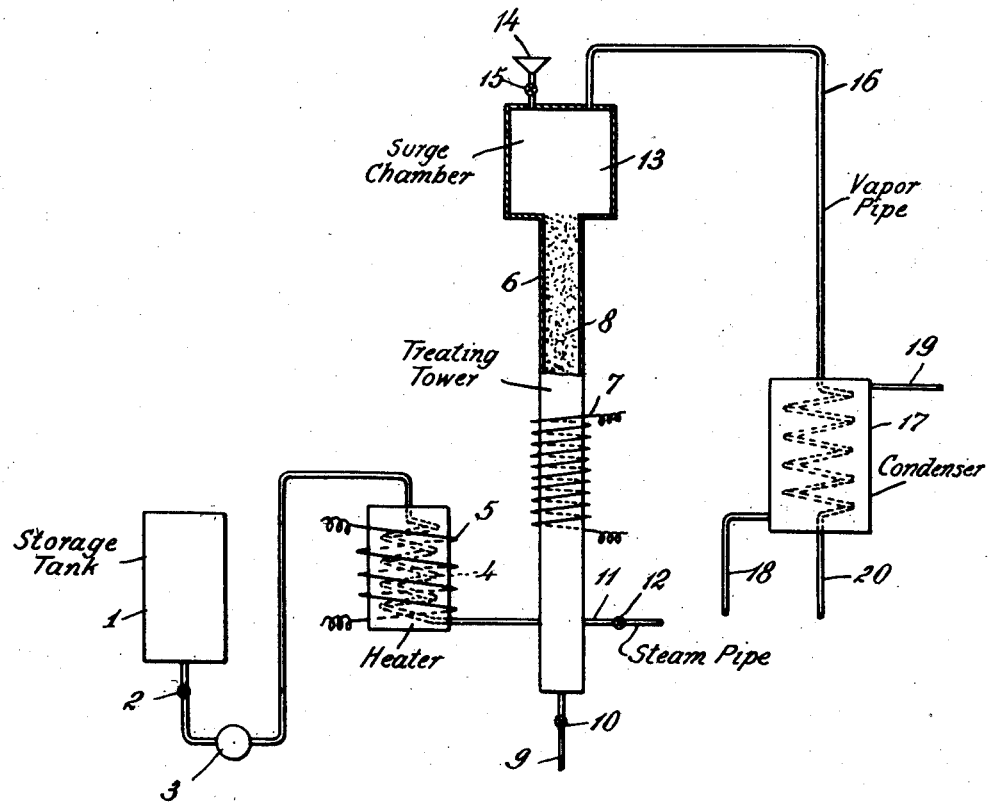
INVENTOR
Wallace A. Craig
BY
ATTORNEYS Patented Aug. 31, 1943

UNITED STATES PATENT OFFICE 2,328,059

MANUFACTURE OF ETHERS

Wallace Alexander Craig, Los Angeles, Calif., assignor to Richfield Oil Corporation, Los Angeles, Calif., a corporation of Delaware Application September 18, 1940, Serial No. 357,250

5 Claims. (Cl. 260—614)

This invention relates to a process of manufacturing ethers and more particularly to a process of converting aliphatic mono-hydroxy alcohols into the corresponding ethers.

In the present invention I provide an improved process of producing ethers in which an aliphatic alcohol, or mixture of alcohols, in vapor form is brought into contact with a solution of a heavy metal salt at an elevated temperature. By the term "heavy metal salts" I mean salts of zinc, copper, cadmium, mercury, iron, chromium, manganese, aluminum, nickel or cobalt. These salts may be the chloride, bromide, sulfate, nitrate, or any of the water or alcohol soluble salts of the above named metals of organic acids, such as the sulfonic acid of benzene, toluene or xylene, or the sulfo acids derived from the treatment of petroleum oils with sulfuric acid.

The process of the present invention possesses many advantages over prior processes of producing ethers. The most commonly used process of the prior art is the method employed for the manufacture of diethyl ether in which reaction is caused between alcohol and sulfuric acid and the resulting product distilled. This process is particularly objectionable if the conversion is made in the presence of a hydrocarbon oil. Under such conditions the side reactions between the sulfuric acid and the hydrocarbon oil impair the quality of the finished material.

In carrying out my invention I employ a maintained solution of a heavy metal salt which apparently serves as a dehydrating catalyst. My conception is that two molecules of the alcohol give up one molecule of water and then combine to produce one molecule of ether. If this conception is correct, the reaction which takes place is as follows:

When mixtures of two or more alcohols are subjected to the same treatment, the reactions are as follows:

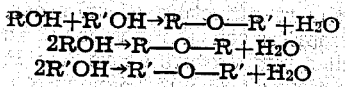

The heavy metal salt serves as a dehydrating agent at the time of the reaction and removes water to thus disturb the equilibrium and favor the formation of ether.

An important advantage of the present invention is that the purity of the alcohols from which the ether is to be made need not be rigorously controlled. When the alcohol or alcohols are brought into contact with the solution of a heavy metal salt, the products of reaction are, for the most part, discharged from the reaction zone as vapor and can be recovered. The solution of heavy metal salt may be circulated in and out of the treating zone either continuously or intermittently. Any objectionable reaction products contained by these solutions may be removed by appropriate means. As stated, the alcohol need not be free of all impurities. Water mixed therewith will not interfere with the conversion. The presence of hydrocarbon oils does not interfere with the conversion provided proper allowance is made to maintain the concentration of the salt at its optimum point. Other common impurities, such as sulfur compounds, are removed by the treatment. The temperature and pressure at which the operation is carried out must be controlled in order to maintain the concentration of the treating solution at a constant value. Due to the formation of water during the reaction, the conditions must be controlled to drive it out of the treater by evaporation at substantially the same rate at which it is formed. The concentration of the treating solution may be maintained within reasonable limits by calculating from the vapor pressure of some predetermined concentration what the temperature and pressure of the system should be in order to maintain the desired partial pressure of water vapor. The operation may then be carried out in accordance with the calculated conditions.

The accompanying drawing is a diagrammatic view of one form of apparatus suitable for use in practicing the process.

In the drawing, the reference numeral 1 designates a storage tank for the alcohol to be treated. The tank is provided with an outlet controlled by a valve 2 and connected to a pump 3 capable of delivering predetermined amounts of liquid. The outlet of the pump is connected to a heater 4 which may be provided with an electric heating coil 5 or other suitable heating means. The heater is in turn connected to a treating tower 6 which may be provided with suitable heating means, herein shown as a heating coil 7. Suitable packing material 8 is arranged within the tower. A drain pipe 9 is connected to the bottom of the tower and is controlled by a valve 10. A pipe 11 is connected to the tower adjacent the bottom and is controlled by a valve 12. This pipe may be employed for delivering steam to the tower. At the top of the tower a surge chamber 13 is formed. The top of the surge chamber is provided with a feed opening 14 controlled by a valve 15. The heavy metal salt or other treating reagent is charged into the tower through this opening. A pipe 16 is connected to the top of the surge chamber and forms a vapor line which extends into a coil arranged within a condenser 17. The lower end of the coil is connected to a discharge pipe 20. The condenser is provided with an inlet 18 and an outlet 19 for water or other cooling fluid.

In practicing the process, a suitable quantity of alcohol, for example isopropyl alcohol, is placed in tank 1. The flow of alcohol is controlled by the valve 2 and by the pump 3. The alcohol in liquid form is delivered to heater 4 which is maintained at a desired temperature. The alcohol is vaporized in the heater and is delivered into the bottom of the treating tower 6. The tower is charged with the desired treating reagent with the level of the liquid in the treating tower almost up to the surge chamber 13. The temperature within the tower is controlled by the heating coil 7 or other suitable heating means. If desired steam may be introduced into the tower through pipe 12. The alcohol vapors pass up through the tower and are brought into intimate contact with the treating solution by the packing material 8. At the beginning of the process the vapors within the tower force a portion of the treating solution into the surge chamber but the surge chamber is of such size that no over-flow into the vapor line 16 is permitted. Equilibrium is eventually established and the solution trickles down into tower 6 as rapidly as it is lifted into the surge chamber. The treated vapors then pass through the delivery pipe 16 into the condenser 17 and the cooled material is conveyed to suitable storage tanks through pipe 20.

In this example a water solution of zinc chloride was used as the treating reagent. Isopropyl alcohol delivered from tank 1 was vaporized in the heater 4 and the vapors entered the treating tower at a temperature of 400° F. to 450° F. The temperature fluctuated between 380° F. and 440° F. at the bottom of the tower, 300° F. and 345° F. adjacent the center of the tower, and 325° F. and 400° F. adjacent the top of the tower. The vapors passing through the system and recovered by condensation consisted of water, an oil phase and gas. The gas consisted largely of propylene, a smaller amount of hydrogen, and lesser quantities of higher molecular weight materials. The oil phase had an ethereal odor and boiled between 100° F. and 537° F. A fraction of this material boiling up to 200° F. possessed excellent anti-knock properties when blended with gasoline and tested in a conventional test engine to determine its octane number. The blending value, i. e., the octane number of the material, calculated from blends with a standard test gasoline is shown in Table I. The reference fuel designated as A-5 is a standard product used in evaluating the anti-knock qualities of other fuels. The octane numbers and blending values were determined by the C. F. R. motor method which is a well-known method in the petroleum industry.

Table I

| Volume per cent of A-5 in blend | Volume per cent of sample in blend | Octane number of blend | Blending value of sample |
|---|---|---|---|
| 100 | 0 | 40.3 | |
| 90 | 10 | 45.8 | 95.3 |
| 80 | 20 | 51.5 | 96.3 |
| 70 | 30 | 58.0 | 99.3 |

In Table II are shown similar values of similar blends of isopropyl ether in A-4 reference fuel. It will be noted that the values obtained from the blends of Table I using the material resulting from the process herein described compare favorably with the values of the blend employing isopropyl ether.

Table II

| Volume per cent of A-4 in blend | Volume per cent of propyl ether in blend | Octane number of blend | Blending value of isopropyl ether |
|---|---|---|---|
| 100 | 0 | 42.0 | |
| 90 | 10 | 47.3 | 95.0 |
| 75 | 25 | 57.3 | 103.2 |
| 50 | 50 | 77.0 | 112.0 |
| 0 | 100 | (1) | |

1 Greater than 100.

While the method described herein is well adapted to carry out my invention, I do not wish to be limited to the conditions herein set forth. Other means of contacting the alcohol vapors with a maintained solution of a heavy metal salt may be used, such, for example, as a vessel provided with mechanical agitators. While I have described in my examples a method of treating, in vapors phase, isopropyl alcohol with solutions of zinc chloride, other aliphatic alcohols may be so treated; also solutions of other heavy metal salts may be employed to effect the desired dehydration, the choice depending upon specific conditions. The process is carried out at pressures preferably in excess of 35 pounds per square inch and not substantially in excess of 100 pounds per square inch. The preferable pressures are from 35 to 75 pounds per square inch.

This application is a continuation in part of application Serial No. 216,280, filed June 28, 1938.

I claim:

1. The method of manufacturing ethers which comprises vaporizing an aliphatic alcohol and delivering the alcohol vapors at a reacting temperature and at a pressure between 35 and 100 pounds per square inch into contact with a maintained solution of chloride of a heavy metal of the group consisting of zinc, copper, cadmium, mercury, iron, chromium, manganese, aluminum, nickel and cobalt.

2. The method of manufacturing ethers which comprises vaporizing an aliphatic alcohol, delivering the alcohol vapors at a temperature between 400 and 450° F. and at a pressure between 35 and 75 pounds per square inch into contact with a maintained solution of a chloride of a heavy metal of the group consisting of zinc, copper, cadmium, mercury, iron, chromium, manganese, aluminum, nickel and cobalt, and maintaining a temperature of above 300° F. during contact of the vapor and the solution.

3. In the manufacture of an ether, the step which comprises contacting vapor of an aliphatic alcohol at a temperature above 300° F. and at a pressure between 35 and 75 pounds per square inch with a maintained solution of a chloride of a heavy metal of the group consisting of zinc, copper, cadmium, mercury, iron, chromium, manganese, aluminum, nickel and cobalt.

4. The method of claim 1 wherein isopropyl alcohol is employed.

5. The method of claim 1 wherein a solution of zinc chloride is employed.

WALLACE ALEXANDER CRAIG.